United States Patent
Bandyopadhyay et al.

(10) Patent No.: US 6,571,008 B1
(45) Date of Patent: May 27, 2003

(54) REVERSE ENGINEERING OF POLYMERIC SOLID MODELS BY REFRACTIVE INDEX MATCHING

(75) Inventors: Amit Bandyopadhyay, Pullman, WA (US); Jonathan C. Christensen, Lakeport, CA (US)

(73) Assignee: Washington State University Research Foundation, Pullman, WA (US)

(*) Notice: Subject to any disclaimer, the term of this patent is extended or adjusted under 35 U.S.C. 154(b) by 0 days.

(21) Appl. No.: 09/369,961

(22) Filed: Aug. 6, 1999

Related U.S. Application Data
(60) Provisional application No. 60/095,730, filed on Aug. 7, 1998.

(51) Int. Cl.[7] .................................................. G06K 9/00
(52) U.S. Cl. .................. 382/154; 356/601; 700/120; 700/161
(58) Field of Search ............................... 382/154, 152; 356/601, 90, 98; 700/112, 192, 120, 161, 119; 378/4, 901; 427/213.3

(56) References Cited

U.S. PATENT DOCUMENTS

| | | | |
|---|---|---|---|
| 3,932,923 A | * 1/1976 | DiMatteo | 29/407.05 |
| 4,328,707 A | * 5/1982 | Clement et al. | 73/618 |
| 4,575,330 A | * 3/1986 | Hull | 425/174.4 |
| 5,139,338 A | 8/1992 | Pomerantz et al. | |
| 5,510,066 A | * 4/1996 | Fink et al. | 264/40.1 |
| 5,578,155 A | * 11/1996 | Kawaguchi | 156/267 |
| 5,621,648 A | 4/1997 | Crump | |
| 5,848,115 A | 12/1998 | Little et al. | |
| 5,880,961 A | * 3/1999 | Crump | 700/112 |
| 6,120,839 A | * 9/2000 | Comiskey et al. | 427/213.3 |
| 6,214,276 B1 | * 4/2001 | Gelbart | 246/401 |

\* cited by examiner

*Primary Examiner*—Bhavesh Mehta
*Assistant Examiner*—Sheela Chawan
(74) *Attorney, Agent, or Firm*—Christensen O'Connor Johnson Kindness PLLC (57) ABSTRACT

A reverse engineering technique allows the creation of 3-D CAD files from a solid model. A solid model of a part to be reverse engineered is created from polymers having an index of refraction matching that of an immersion liquid. Over the immersion liquid is a masking liquid that is substantially opaque. The generally clear polymeric model of the part is moved through the immersion/masking layer interface while images of the cross section of the model are acquired at the interface layer. The images are then used to create digital solid models from a physical model or to compare an existing physical model with its digital model.

21 Claims, 7 Drawing Sheets

REVERSE ENGINEERING OF POLYMERIC SOLID MODELS BY REFRACTIVE INDEX MATCHING

This application claims the benefit of U.S. Provisional Application No. 60/095,730, filed Aug. 7, 1998. The subject matter of Provisional Application No. 60/095,730 is incorporated herein by reference.

FIELD OF THE INVENTION

This invention generally relates to a method and apparatus for reverse engineering an object, and more particularly, to a method and apparatus for non-destructive reproduction of an object in computer memory and associated displays as well as in a hard copy form, such as paper.

BACKGROUND OF THE INVENTION

The concept and advantages of reverse engineering (RE) are not new to the industrial design and manufacturing arena but the widespread application of reverse engineering has not been seen. The simplest definition of reverse engineering is probably the designing a product from its physical model, whereas rapid prototyping (RP) builds solid models directly from computer aided design (CAD) files.

There are several methods available to reverse engineer solid physical objects to create three-dimensional images in an electronic domain. Most of these methods involve some kind of data acquisition from the surface of the object via contact or non-contact means. Though most of these methods are non-destructive in nature, some of them are destructive. The result of these methods is a computer generated image of the solid object which then can be displayed either by way of a electronic display, or in hard copy form such as paper.

Presently, some of the applications of RE are limited to redesigning old products by the same company, or for products that are in use but whose vendor is no longer in business. Effective utilization of RE, however, could save significant time and money in many other areas of business such as manufacturing.

Commercial RE processes can also be distinguished based on the various data acquisition techniques utilized by the RE system. Most of the current RE systems use one or more of the following technologies to obtain three-dimensional data from a part: (a) surface contact based technology, (b) optics based technology, (c) laser scanning based technology, and (d) radiation/x-ray/ultrasound based technology.

Of these technologies, the surface contact based technology is probably the most common. Most devices that use the surface contact technology are called coordinate measuring machines or CMM. Machines of this type employ rotary and linear encoders along with the appropriate transformation matrices in order to calculate the X, Y and Z positions of the probe tip. These coordinate triplets are then stored in a file, which can then be used to reverse engineer the surface of a part. This method is usually slow, costly, and requires a degree of skill. Moreover, if there is some critical geometry where the tip can not reach, this technique will not be able to reverse engineer that part. Most often, CMM techniques are used to perform part quality inspection and reverse engineering of simple shaped parts.

Commercial reverse engineering systems using optics have become more popular due to the increased availability of powerful computers. There are various techniques that can be used to determine a part's three-dimensional coordinates optically. Moire interferometry, triangulation (stereo optics), and perspective reconstruction are some of them. Using the interferometry method, known patterns are projected onto the object and then read by a scanner or camera from a different known location. The fringe patterns are compared to give relative depth between areas on the surface of the part. The use of stereo optics can also provide three-dimensional data by triangulation. In this method, two scanners, such as cameras, are placed at a known distance from each other while the part is placed in between. Using a triangulation method, the coordinates of a desired location or the part can be determined. The optical method, however, has limitations based on the geometry and optical characteristics of the part. Generally the part must be rotated to capture all sides, and geometries that are hidden from the direct line of site of the imaging system cannot be scanned. Additionally, the imaging system may incorrectly interpret a part based on its optical characteristics. For example, if the surface of the part is transparent, such as a glass object, several errors may result.

A destructive optical method described in U.S. Pat. No. 5,621,648 and 5,880,961 is incorporated herein by reference. The method disclosed in these patents consists of cutting away a slice of the object, scanning the slice, and repeating this process until the object has been completely sliced and imaged. Once the object has been completely sliced the resulting images are reconstructed into a three-dimensional model. While accurate, this method is destructive and can be time consuming due to machining. Moreover, the process is difficult to use with brittle materials such as ceramics and glasses.

Laser scanning is another approach for various commercial reverse engineering systems where the lasers are primarily used for range-finding. These lasers work by scanning the part from all sides by either rotating the part or the laser. The resulting files are the same as those obtained with the contact method but can be more uniform due to automatic computer controlled scanning. These methods will not work for parts that have internal features or hidden geometry, and are inaccurate for clear or transparent parts because the laser does not reflect normally off a transparent object such as glass. Furthermore, laser scanners are generally expensive.

There also exist methods and apparatus for capturing both internal and external features of a physical object using ultrasound and x-rays. Among the methods most commonly used in a non-destructive manner include ultrasound imaging and computed tomography (CT). Ultrasound imaging is generally not an accurate means for reproducing physical measurements. CT is quite popular in the medical field and can produce accurate images. However, the machines to perform CT are quite expensive and CT presents radiation hazards because of the x-ray producing equipment that is required for this process. Some of these known methods also require substantial time investments in terms of human time as well as central processing unit time or computer time.

With the increased reliance on graphical digital models, there is a need to develop low cost reverse engineering systems that provide accurate data to industrial, entertainment, consumer, and other markets. Some of the applications of these RE systems include quick reference design of old parts, statistical process control or quality control of parts, modification of old designs for which there no CAD data available but the some of the parts are available. As described in the following, the present invention provides a method and apparatus that meet these criteria and solves other shortcomings in the prior art.

SUMMARY OF THE INVENTION

In accordance with the present invention, a method and apparatus for reverse engineering of solid objects is provided, that is both fast and non-destructive,. More specifically, an original part, having a known refractive index (RI), made of a clear material is moved through a liquid interface formed by an immersion liquid having substantially the same RI of the part and a masking liquid having a different RI of the part thereby allowing an imaging system to view segments of the original part at the immersion/masking liquid interface.

In accordance with further aspects of the invention, a new method and apparatus is provided to create three-dimensional electronic representations of a solid object in a non-destructive manner for display on a computer monitor, for printing on paper, or for other desired uses. The part to be re-engineered is at least partially immersed in the immersion liquid having substantially the same refractive index as the part itself Accordingly, the immersed portion of the part would become essentially "invisible." The masking liquid having a density less than that of the immersion liquid and having a different refractive index, is maintained above the surface of the immersion liquid. The at least partially immersed part is then viewed through a CCD camera linked to a digital signal processor. In this manner, the cross-sectional image of the part, as it appears at the liquid interface between the immersion liquid and the lower density masking liquid, is relayed to the digital signal processor. This relaying of information may be continuous or step-wise as the part is moved upward (or downward) through the immersion/masking liquid interface to provide a complete or partial record of its cross section at various surfaces of interest. The raising or lowering of the part may be carried out by a Z-axis linear slide/stepper motor and controller with a predetermined step size.

Image acquiring at the immersion liquid-low density liquid interface, of the cross-sectional images of the immersed part, is carried out by an apparatus for acquiring data such as a CCD camera in a continuous or step-wise mode. The data processing for the captured images can then be performed using relevant software and the software will allow images to be stored in any desired image format. Images are then processed to "two color images" using, for example, Paintshop Pro™ software or its equivalent. This step allows the method to perform the step of image edge detection. Image detection is in turn carried out using, for example, Paintshop Pro™ software or its equivalent. The images are then converted using a raster-to-vector software, supplied by KVEC. This software then permits export of the cross-sectional information as DXF files. Another type of software, such as CADKEY 97™ or its equivalent, may be used as a CAD program to import the DXF files and expand them into three dimensions to create three-dimensional electronic representation of a solid object. This same software can also be used to edit or manipulate any cross sections or surfaces, if necessary.

The invention also contemplates combining all of the above-mentioned software into a single program for carrying out all of the functions as described. In addition, the software may also control the Z-position of the part by controlling the stepper motor through a parallel port of a digital signal processor.

Once a complete digital image of the part has been formed, the information stored in the digital signal processor may then be used to prepare a solid prototype, which is a copy of the original part, using any rapid prototyping machine

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1A:
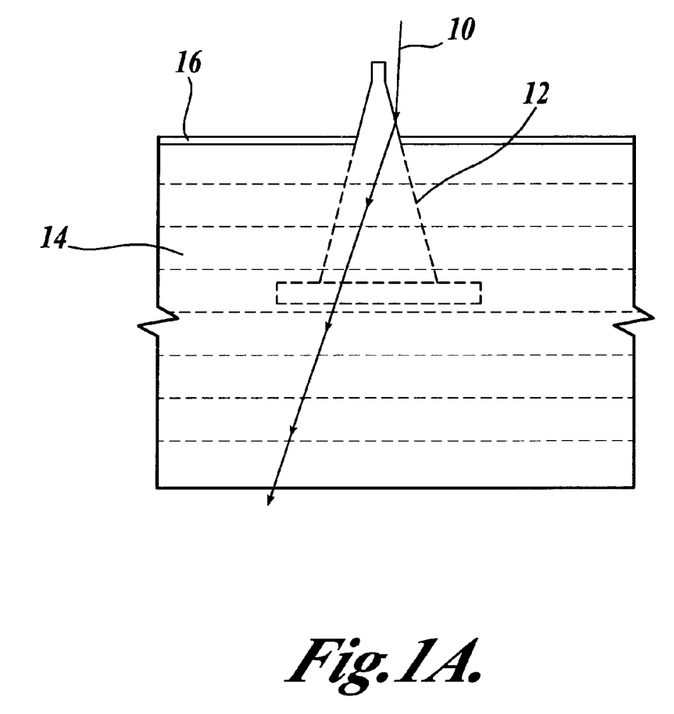
FIG. 1 is a diagram illustrating the effect of a match (a) between an immersion medium and a partially immersed solid body, and the effect of no match (b) between the refractive indices of the solid body and the immersion medium.
Figure 1B:
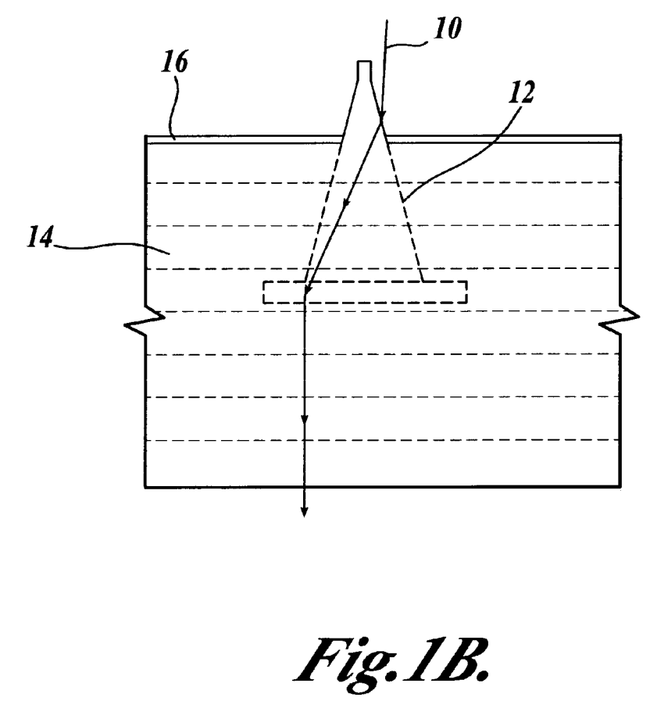

FIG. 1B illustrates what happens when a ray of light 10 intersects a clear part 12 having an index of refraction that is different than the immersion liquid 14 in which the part 12 is placed. When the part 12 has a different refractive the part is usually easily seen because the light passing through the two mediums changes direction. FIG. 1A, however, illustrates that when the part's index of refraction matches that of the immersion liquid, the direction of the light passing through the two media will not change and the immersed part cannot be seen easily by an imaging system. This "disappearing" effect can be used to see through a part to look at a specific cross section of the part. Using a masking liquid 16, which floats on top of the immersion liquid 14, the cross-section of the immersed part can be seen at the immersion/masking liquid interface. Careful Refractive Index Matching (RIM) is preferred between the part 12 and immersion liquid 14 in order to avoid inaccurate data due to distortion as can be seen in FIG. 1B where the light changes direction many times.

Figure 6:
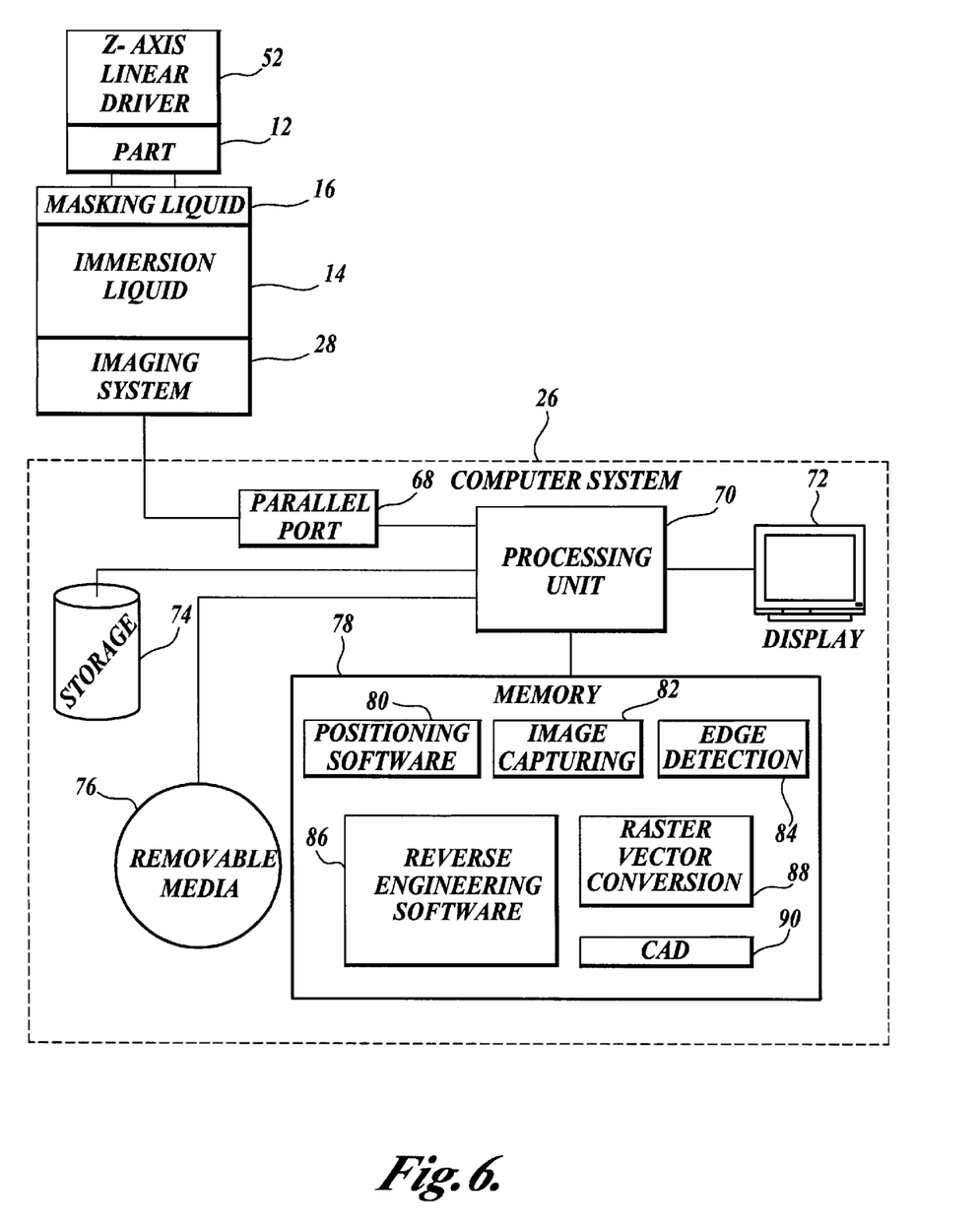
FIG. 6 is a block diagram representation of the reverse engineering system of the present invention.

FIGS. 2A–2D illustrate an example of one embodiment of the present invention. A computer system 26 receives images from an electronic imaging system 28, such as a CCD camera, that is mounted below a tank 30 containing the immersion liquid 14. Images from the camera are stored in a memory of the computer system 26 for use in creating a three-dimensional model of the part 12 to be reverse engineered. In the example shown, the part 12 is a simple cone with a rough-cut rectangular base that was created from GE RTV615 silicone. This cone is placed in the containment tank 30. On the back wall of the tank 30 is mounted a z-axis linear driver 52, as shown in FIG. 6, that moves the part 12 in and out of the immersion liquid 14. The immersion liquid consists of a sugar-water solution whose refractive index is matched with the refractive index of the GE RTV 615 silicone. A masking liquid 16 consists of a kerosene based black die. Due to the properties of the masking liquid 16 the masking liquid 16 forms a liquid interface on top of the immersion liquid 14.

To create the three-dimensional reconstruction of the part 12, the cone is completely immersed into the immersion liquid 14 and placed at the center of the tank 30. The masking liquid 16 is then placed on top of the immersion liquid 14. The imaging system 28, in this case a ViCAM CCD camera, is placed below a glass bottom of the tank 30 and is focused at the liquid interface of the immersion liquid 14 and the masking liquid 16. Images of the cross sections of the part are taken every 0.050 inch in the Z-direction by moving the part 0.05 inch per step and taking serial images of the cross-sections at the liquid interface formed by the immersion liquid 14 and masking liquid 16. It will be appreciated by those of ordinary skill in the art that slice intervals are dependent upon the resolution of the hardware used in the reverse engineering system.

Figure 2A:
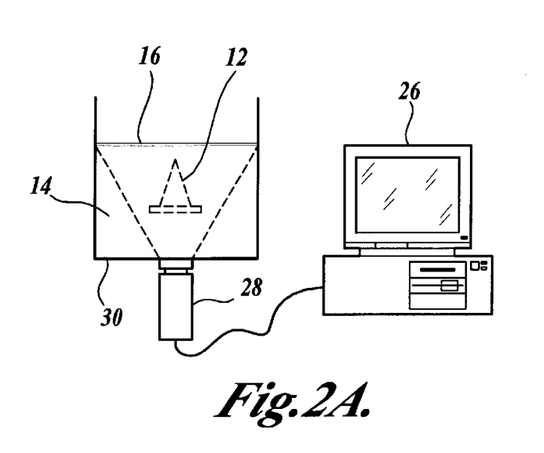
FIGS. 2A–2D illustrate the process of the present invention, using a polymeric solid body immersed in a liquid with a matching refractive index.
Figure 2B:
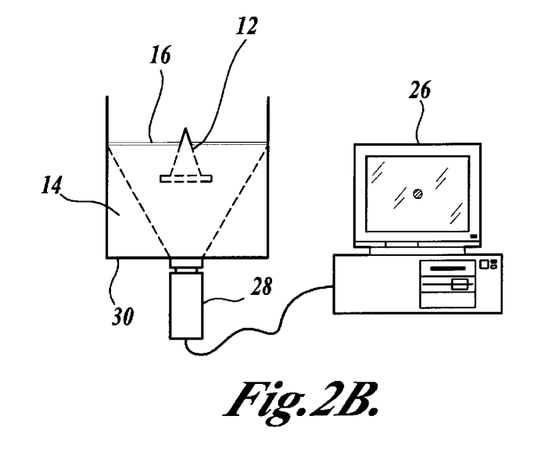
Figure 2C:
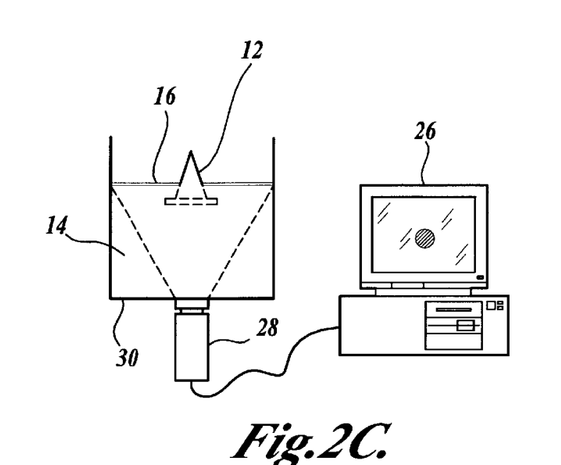
Figure 2D:
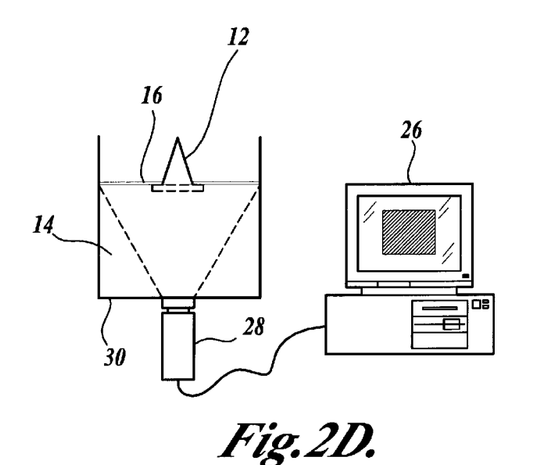

In FIG. 2A, the picture on the computer system 26 shows only the color of the masking liquid. In one embodiment of the invention the masking liquid 16 is a dyed liquid with an opposite polarity and a density less than that of the immersion liquid 14. Because of these properties, the masking liquid 16 floats on top of the immersion liquid 14 and prevents light from passing through. This masking liquid 14 introduces necessary contrast to differentiate the part 12 from the immersion liquid 14. As the part 12 is raised up through the masking liquid 16, as shown in FIGS. 2A–2D, a cross-sectional image is seen by the imaging system 28, and displayed on the computer system 26, where the cone penetrates the masking liquid 16. By maintaining the Z level of the masking liquid 16 and taking images of the cone as it is raised up through the masking liquid 16, a digital model of the cone can be created. As the cone is raised through the masking liquid 16 a cross section of the cone is imaged. After the part 12 has moved through the masking liquid 16 some predetermined amount a collection of cross-sectional images has been created which can then be processed. It will be appreciated by those of ordinary skill in the art that the images may be taken in any order so long as the images may be properly placed before three-dimensional reconstruction. It will also be appreciated that instead of raising the part through the masking liquid, the part can also be dipped into the immersion liquid through the masking liquid.

FIGS. 4A–4D show the results of the raw data received from the imaging system as the part is moved through the immersion/masking liquid layer. The data is image processed and imported into a CADKEY 97™ program as utilized in one embodiment of the invention. The image processing in one embodiment of the invention consists of converting the image from color image to black and white, performing edge detection on the black and white image, performing a raster to vector conversion on the image, and then exporting DXF files to the CAD program.

Once the DXF files are loaded into the CADKEY 97™ program, or other program, a three-dimensional image is created of the part which can then be displayed on a computer monitor, or printing on a paper or for other desired uses.

Accuracy is a key factor in selecting any reverse engineering method. Some RE applications may require a higher degree of accuracy than other applications where a crude shape of the part may be sufficient. It is important to understand that many factors are involved in determining the accuracy of the RE system. These factors, among others, include: the degree of refractive index matching between the part and immersion liquid; the degree to which the masking liquid can actually mask light; fluid properties of the masking liquid such as viscosity, surface tension, and its ability to flow on top of the immersion liquid; camera resolution and software edge detection accuracy and consistency.

Fluid properties of the masking liquid and the immersion liquid are another set of important factors. If the masking liquid does not flow around the part, it is difficult to obtain an accurate cross-sectional image obtained for edge detection. It should be noted, however, that detailed experiments were not performed to understand the effects of surface tension, the mask's meniscus or viscosity. But some of the observations may serve as a basis for the development of a better system. If a part with a large flat surface is oriented such that the surface is parallel to the mask surface, the error will be more, because the masking liquid will be dragged along the part.

Figure 5A:
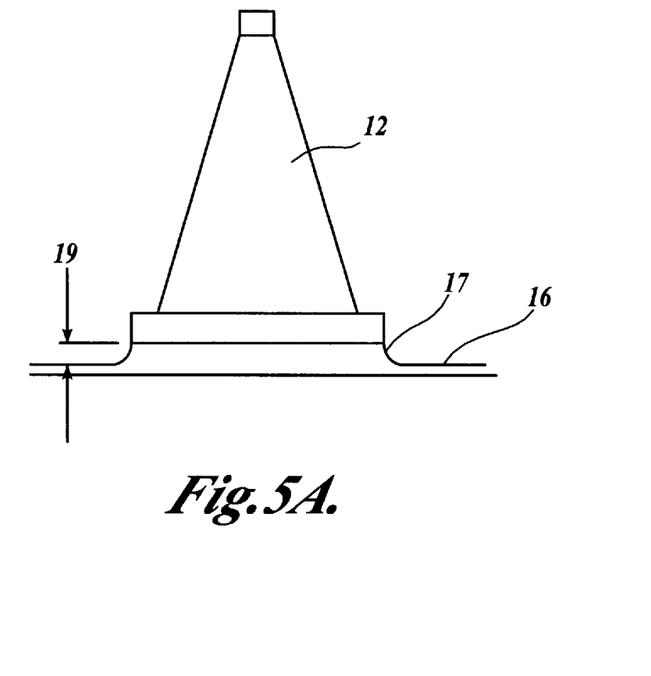
FIG. 5 is a schematic representation of the possible errors during reverse engineering of an object using refractive index matching.

FIG. 5A illustrates a possible scenario where the masking liquid is drawn onto a horizontal plane of a part and can therefore cause the part to appear thicker than it actually is at that specific Z-level.

Figure 5B:
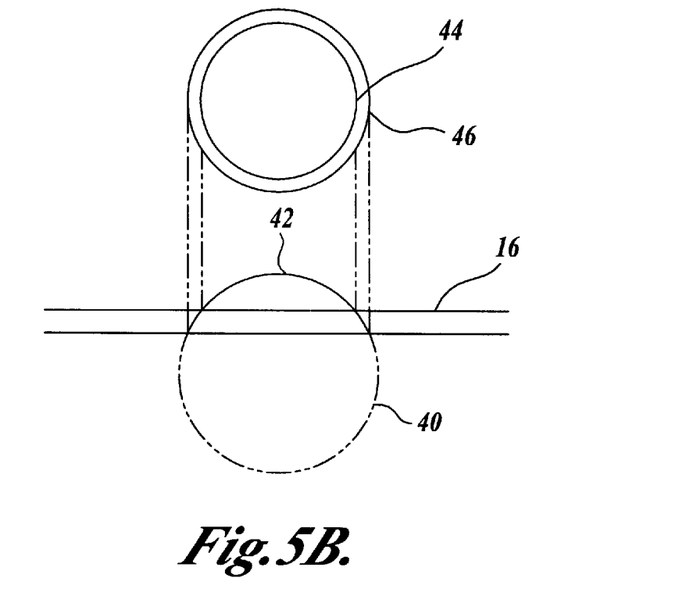

Another possible source of error is shown in FIG. 5B. This drawing represents a sphere 40 that is mostly submerged in the immersion liquid with a small portion 42 sticking up through the masking liquid 16. This illustrates how the thickness of the masking liquid along with a meniscus could create region of ambiguity. If the edge detection software 84, as shown in FIG. 6, has aggressive threshold settings then the cross section will appear smaller than if a mild setting is used. Theoretically, if the masking liquid 16 works perfectly, this would not happen. One of the ways to minimize this effect is to keep the masking liquid 16 as thin as possible.

Figure 3:
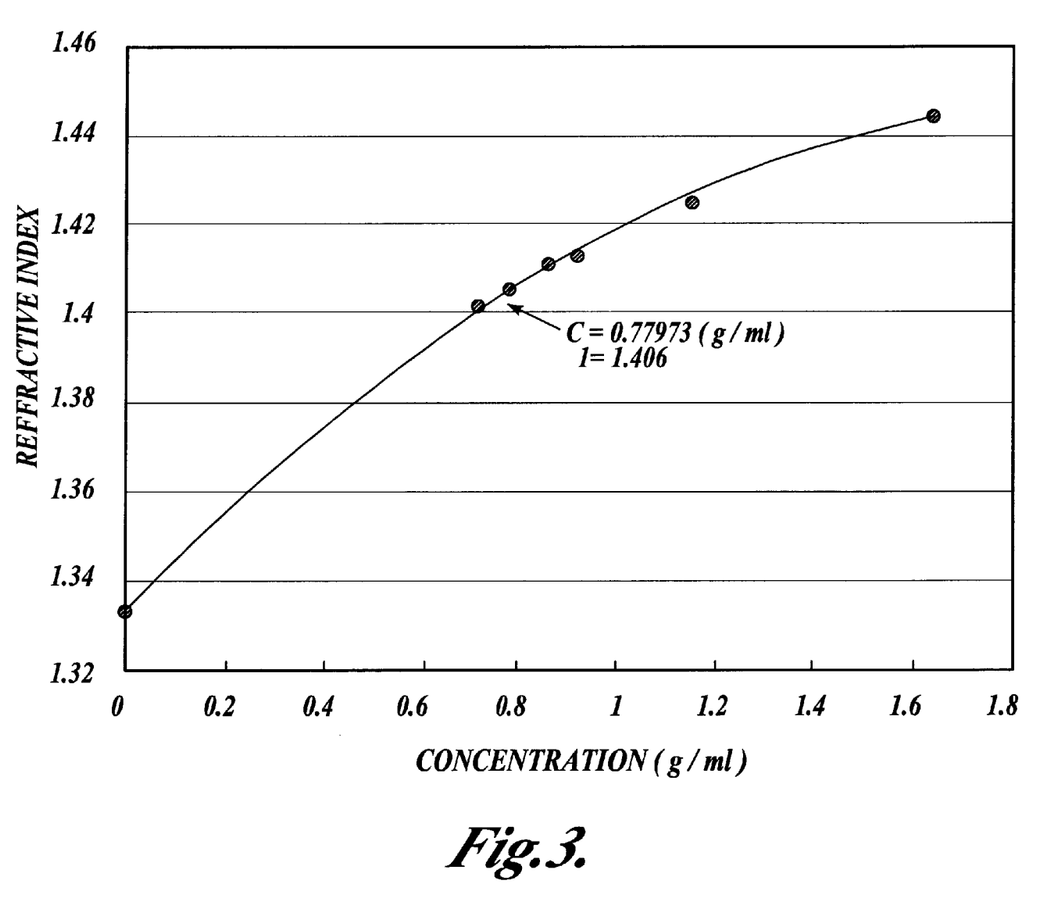
FIG. 3 is a graph illustrating the change of refractive index of a sugar and water solution, with increasing concentration of sugar.
Figure 4A:
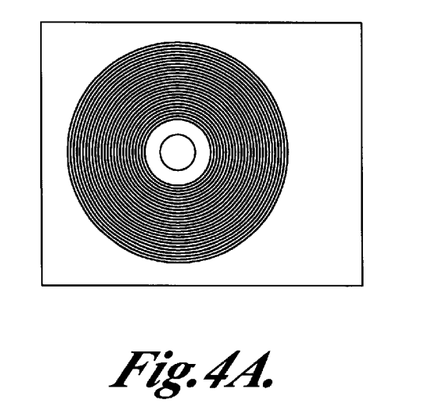
FIGS. 4A–4D are diagrams representing CAD pictures of imported DXF cross sections, in accordance with the present invention.
Figure 4B:
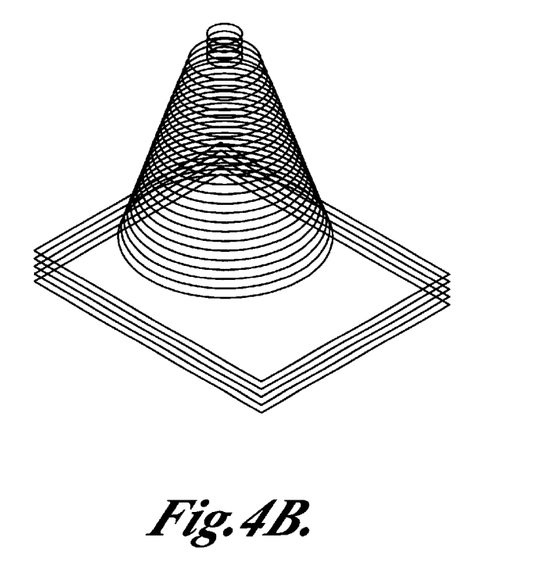
Figure 4C:
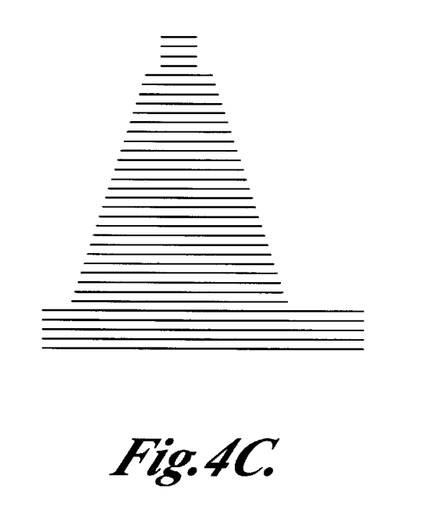
Figure 4D:
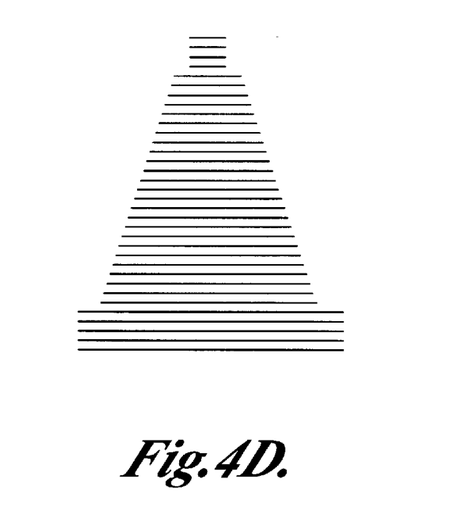

FIG. 6 illustrates the various components of one embodiment of the present invention. Inside the containment tank 30 is the immersion liquid 14 with a small amount of masking liquid 16 on top. In one embodiment of the invention, in order to remain environmentally safe, the immersion liquid 14 is a simple sugar water solution. The concentration of the sugar in the water determines the index of refraction and can be matched with many clear materials such as silicones, polymers and glasses. FIG. 3 illustrates the refractive index ranges experimented with thus far, along with corresponding concentrations. It will be appreciated by those of ordinary skill in the art that the other immersion liquids such as water-glycerene, or oil based liquids can also be used for this purpose as long as the refractive index of the solution can be controlled and matched with the object material. It will also be appreciated by those of ordinary skill in the art that the allowable deviance between the index of refraction of the immersion liquid with the index of refraction of the part is related to part size and complexity. Therefore, the amount of allowable deviance for a sphere would be greater than for a highly complex object. Referring back to FIG. 6, a Z-axis linear driver 52 is mounted on the back of the containment tank 30 to raise the part 12 up through the masking liquid 16 and the imaging system 28 which is mounted on the bottom of the containment tank 30. It will be appreciated by those of ordinary skill in the art that the part could be moved in a stepwise or continuous manner. It will also be appreciated by those of ordinary skill in the art that any electrical or mechanical device that performs the task of moving the part through the immersion/masking liquid interface can be used. Additionally, the part does not have to be moved in a fixed orientation as it is moved through the immersion/masking liquid interface. If the part changes orientation, as it moves through the immersion/ masking liquid interface, the computer system keeps track of the orientation of the part at each location where an image is acquired. This allows the computer system to correctly orient the images and construct the three-dimensional image. As indicated above, in one embodiment, the imaging system 28 is a 640×480 pixel, ViCAM digital camera, which is readily available in the current marketplace. At the point of contact between the immersion liquid 14 and masking liquid 16 a liquid interface is formed. The imaging system 28 is attached to a computer system 26, which in one embodiment is a Pentium II-266 computer, through a parallel port 68. It will be appreciated by those of ordinary skill in the art that other modes of data imaging systems can be used to acquire images of the part, such as digital or analog video cameras, analog cameras, or even non-optics based systems, such as x-ray systems, or ultraviolet systems. For example, the use of x-rays as an imaging system will allow the present invention to work in environments that would not be conducive for optics based imaging systems. It will also be appreciated by those of ordinary skill in the art that the imaging system does not need to be attached to the computer system.

Attached to the computer system 26 is a display 72. The computer also has a processing unit 70 which can run the RE software 86. The computer system also has memory 78 for storing the software and data during execution or permanently. Fixed storage 74 as well as removable media 76 is part of the computer for tasks such as image or program storage. It will be appreciated by those of ordinary skill in the art that the computer system 26 may include many more components than those shown in FIG. 6. Such components are not described because they are conventional, and a description of them is not necessary to an understanding of the present invention.

FIG. 6 also illustrates the software that is used in one embodiment of the invention. First, image capturing software 82 is used to capture and save cross-sectional images into storage 74 or removable media 76 in a manner that allows the computer system 26 to construct a three-dimensional image of the part 12 in the correct order. In one embodiment of the present invention, the software which came with the ViCAM CCD camera was used which allowed images to be saved in many different industry standard formats. Image processing is then performed on the images received from the imaging system 28. In one embodiment of the invention, the image is saved into storage 74 or removable media 76, the images are then converted to two color images with the use of Paintshop Pro™ software of Jasc Software, Minnetonka, Minn. Paintshop Pro™ is also used to perform edge detection on the two color images. After the images are converted to two color images and edge detection is performed, the images are converted from a raster-to-vector format using a raster-to-vector software 88 by the name of KVEC™ of K-H Kuhl, Weiden, Germany. In one embodiment of the invention in order to use the images for reverse engineering, the cross section edges must be detected with edge detection algorithms and then converted to a vector format. Currently, the DXF file format is being used.

Once created, each cross section is then imported into a computer aided design (CAD) program 90 at the correct Z-level. In one embodiment of the present invention CAD-KEY 97™ software by Baystate Technologies of Marlborough, Mass. was used as a CAD program 90 to import the DXF files and expand them into three dimensions. CADKEY can also be used to edit any cross sections if necessary.

In addition to the image processing and CAD software, simple positioning software 80 is required to drive a stepper motor. The Z-axis linear driver 52 is triggered by the positioning software 80 after each image is acquired. The part 12 can be raised or dipped through the masking liquid 16. In one embodiment of the present invention, controlling the Z-position of the part 12 was done through low-level programming of a computer system 26 parallel port. This software essentially sends pulses to the parallel port, which are then interpreted by the Z-axis linear driver hardware. It will be appreciated by those of ordinary skill in the art that all of the above-listed functions may be incorporated into one or more software packages. For example, the above-listed functions could be incorporated into two different packages. One package could do positioning, image acquiring, edge detection, and DXF translation and the other package could do the 3D processing. It will also be appreciated that the Z-axis linear driver may be any part that can be moved at a predetermined rate or amount.

Figure 7:
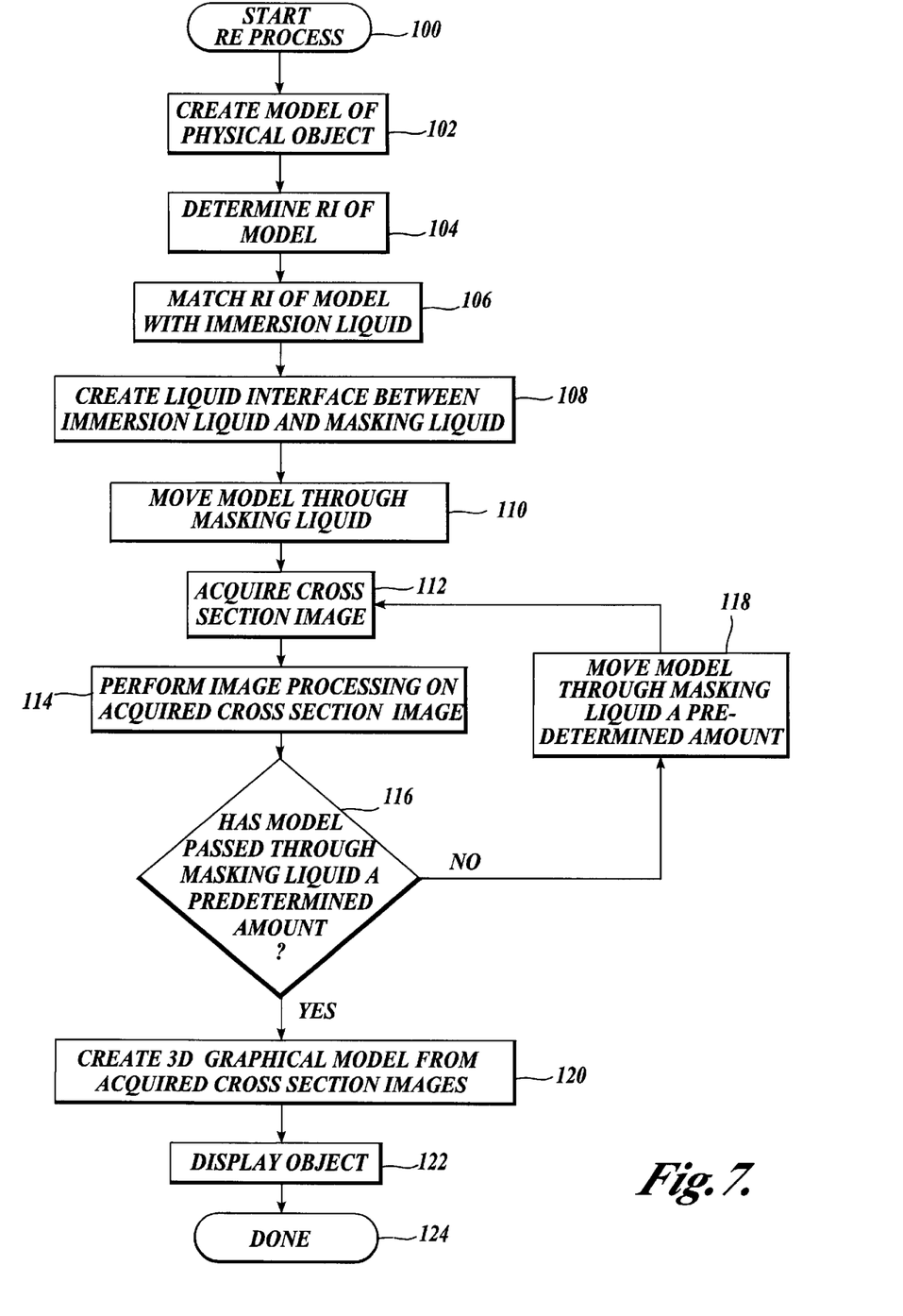
FIG. 7 is a flow diagram illustrating the reverse engineering process of the present invention.

FIG. 7 is a flow chart illustrating one embodiment of the present invention. The logic begins at block 100 and proceeds to a block 102 where a model of a physical object to be reverse engineered is created. First, the object to be reverse engineered is made from a clear material such as polymer or glass with a refractive index. If the object is made of some other material, a negative of the object can be cast using a clear material and then the negative can be reverse engineered using this system. In one embodiment of the present invention, General Electric RTV615 silicone was used. It will be appreciated by those of ordinary skill in the art that the present invention is not limited to these polymers only. In general, any clear polymer can be used as long as the refractive indices of the model and immersion liquid can substantially be matched. It will be appreciated by those of ordinary skill in the art that if non-optically based imaging system, such as an x-ray imaging system, is used the model does not need to be a clear polymer. Rather, the model could be opaque, or made of a different material. It will also be appreciated by those of ordinary skill in the art that models made of other materials such as metals, ceramics or opaque polymers can also be reversed engineered using an indirect approach. In the case of indirect approach, a clear polymeric mold will be cast from the solid part and then the mold can be used for the RE process. A positive of the mold will then be virtually created from the virtual image of the mold. The mold may also be used to cast positives using clear polymers which can then be used for the RE systems. For all of those cases, direct or indirect, the actual RE process will remain same.

In box 104 the refractive index (RI) of the model is determined. Depending on the material used to build the model the refractive index will change. Once the RI of the model is determined, box 106 shows that an immersion liquid is prepared that has substantially the same RI as the model. As noted above, in order to avoid distortion, it is preferred that the difference between the RI of the model and the RI of the immersion liquid be as small as possible. Matching the RI of the part with that of the immersion liquid is an important factor though in some circumstances it may be kept constant to reduce the number of variables that can affect system accuracy. In one embodiment of the present invention the refractive index of the immersion liquid was matched to within 0.001 of that of the silicone models. In other embodiments of the invention, the refractive index of the immersion liquid was matched to within 0.05 of that of the silicone models. As noted above, it will be appreciated by those of ordinary skill in the art that the object shape and complexity effects the matching levels of the RI.

Once the immersion liquid is prepared, box 108 shows that a liquid interface is created by placing a masking liquid on the immersion liquid. As noted above, in one embodiment of the invention, the masking liquid is a dyed liquid that has an opposite polarity of the immersion liquid. Also, in one embodiment of the present invention, the masking liquid has a density less than the density of the immersion liquid thereby allowing the masking liquid to float on top of the immersion liquid. It is important to note that the masking liquid may be placed at any location where a model may pass through the masking liquid from the immersion liquid or from the masking liquid to the immersion liquid. In one embodiment of the present invention, the masking liquid is dyed in order to provide contrast for the image processing steps. It will be appreciated by those of ordinary skill in the art that the masking liquid does not need to be dyed if the image processing can be performed without this contrast. The properties of masking liquid are important for maintaining a high level of accuracy for this process. It is preferable that the masking liquid be as thin as possible to give an accurate silhouette of the desired cross section, thus it should also be opaque. It will be appreciated that some degree of "shine through" can be allowed if appropriate image filtering can be used to process the resulting images.

At block 110 the model is moved through the immersion/masking liquid interface. As the model is moved through the masking liquid, block 112 shows that an image is taken of the model. This image shows a cross section of the model that is later used to create a three-dimensional graphical representation of the model.

In block 114 image processing is performed on the cross section images. It will be appreciated by those of ordinary skill in the art that this image processing may be performed at any time prior to, or concurrently with creating the three-dimensional graphical digital model. In the one embodiment of the present invention the cross section edges are detected using commonly available edge detection algorithms and then the images are converted to a vector format.

In decision block 116, the reverse engineering system determines if the model has passed through the masking liquid to a predetermined level. If not, the logic proceeds to block 118 where the system moves the model a predetermined amount. The logic then returns to box 112 where a cross section image is taken after the model has been moved the predetermined amount. Boxes 114, 116, and 118 are then repeated until the model has been moved the predetermined amount.

Once the model has passed through the masking liquid the predetermined amount box 120 shows that a three-dimensional image is created from the two-dimensional cross sections. In one embodiment the images process files are saved in a DXF file format and then imported into a computer aided design (CAD) program. It will be appreciated by one of ordinary skill in the art that there are many programs and methods to create a three-dimensional object from two-dimensional cross sections. After the three-dimensional model is created box 122 shows that the object is displayed on the computer display or printed to the printer.

From the above CAD file, it is possible to create an electronic representation of the object of interest on computer screen, to print the design on paper or to build a physical model of the part. It will be appreciated by those of ordinary skill in the art that from a CAD file a stereo-lithography (STL) file can also be generated. This STL file could then used to create a physical model using polymeric materials through the use of a commercial machine, such as a FDM 1650 machine, Stratasys™ Inc., Eden Prairie, Minn. Box 124 indicates the process of the present invention is done.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A method for reverse engineering an object, comprising:
    (a) moving the object through a liquid interface formed by an immersion liquid and a masking liquid,
        (i) wherein the immersion liquid has substantially the same refractive index as the object,
        (ii) wherein the masking liquid is substantially opaque; and
    (b) acquiring cross-sectional images of the object at the liquid interface as the object is passed through the liquid interface;
    (c) processing the images of the object to create a three-dimensional model of the object.

2. The method of claim 1, wherein processing the cross-sectional images of the object to create a three-dimensional model of the object comprises:
    (a) detecting the edges of the object in the cross-sectional images;
    (b) converting the images from a raster format to a vector format; and
    (c) exporting the vector format to a CAD program.

3. The method of claim 1, where the masking liquid has a different refractive index and density of the immersion liquid.

4. The method of claim 1, where the masking liquid is a liquid with an opposite polarity of the immersion liquid.

5. The method of claim 1, further comprising displaying the three-dimensional object.

6. The method of claim 5, where the object is displayed on a computer screen.

7. The method of claim 5, where the object is displayed on paper.

8. The method of claim 1, wherein the cross-sectional images of the object are acquired at the immersion/masking liquid interface with an optics based imaging system.

9. The method of claim 1, wherein the cross-sectional images of the object are acquired at the immersion/masking liquid interface with non-optics based imaging system.

10. The method of claim 1, where the object is a substantially translucent.

11. The method of claim 1, wherein creating the three-dimensional model of the object comprises:
    importing the acquired cross-sectional images into a CAD program; and
    allowing the CAD program construct the three-dimensional model.

12. The method of claim 1, where the object is moved through the immersion/masking liquid interface using a linear actuated driver.

13. Apparatus for reverse engineering an object, said apparatus comprising:
    (a) an object having a refractive index;
    (b) a tank;
    (c) an immersion liquid disposed in the tank, the immersion liquid having substantially the same refractive index as the object;

(d) a masking liquid that is disposed in the tank, the masking liquid being substantially opaque and a liquid interface is formed by the immersion liquid and masking liquid;
(e) an image sensor that acquires cross-sectional images at the liquid interface;
(f) means for moving the object through the liquid interface;
(g) a computer system that receives multiple cross-sectional images, taken by the image sensor, and builds a three-dimensional representation of the object from the images.

14. The apparatus of claim 13, where the masking liquid has a different refractive index and density than the immersion liquid.

15. The apparatus of claim 13, where the masking liquid has an opposite polarity of the immersion liquid.

16. The apparatus of claim 13, where the image sensor is optics based.

17. The apparatus of claim 13, where the image sensor is non-optics based.

18. The apparatus of claim 13, where the object is substantially translucent.

19. The apparatus of claim 13, where the computer system uses a CAD program to build construct the three-dimensional model.

20. The apparatus of claim 13, where the means for moving the object is a linear actuated driver.

21. The apparatus of claim 13, further comprising a display capable of displaying the three-dimensional representation of the model.

* * * * *

UNITED STATES PATENT AND TRADEMARK OFFICE
CERTIFICATE OF CORRECTION

PATENT NO. : 6,571,008 B1
APPLICATION NO. : 09/369961
DATED : May 27, 2003
INVENTOR(S) : A. Bandyopadhyay et al.

Page 1 of 1

It is certified that error appears in the above-identified patent and that said Letters Patent is hereby corrected as shown below:

| COLUMN | LINE | ERROR |
|---|---|---|
| 1 | 10 | before the heading "FIELD OF THE INVENTION", please insert the following paragraphs:<br><br>--STATEMENT OF GOVERNMENT RIGTHS<br><br>Research leading to the present invention was supported, at least in part, under grant N00014-98-1-0550 awarded by the Office of Naval Research. The Government may have certain rights in the invention.-- |

Signed and Sealed this

Nineteenth Day of September, 2006

JON W. DUDAS
*Director of the United States Patent and Trademark Office*